Nov. 20, 1956

M. HOLMBURGER 2,771,178

BELT CONVEYOR TAKE-UP

Filed May 9, 1952

2 Sheets-Sheet 1

INVENTOR.
Max Holmburger
BY
ATTORNEY

Nov. 20, 1956  M. HOLMBURGER  2,771,178
BELT CONVEYOR TAKE-UP
Filed May 9, 1952  2 Sheets-Sheet 2

INVENTOR.
Max Holmburger
BY
ATTORNEY.

United States Patent Office 2,771,178
Patented Nov. 20, 1956

2,771,178

BELT CONVEYOR TAKE-UP

Max Holmburger, Chicago, Ill., assignor to Link-Belt Company, a corporation of Illinois Application May 9, 1952, Serial No. 287,053

6 Claims. (Cl. 198—139)

This invention relates to new and useful improvements in gravity type take-up mechanisms for belt conveyors and deals more particularly with horizontal type take-ups for use in connection with belts having an unusually great variation in their lengths during operation of the conveyors.

Belt conveyors of great length and those employing belts with a relatively high degree of resiliency present some unusual and difficult problems in connection with the provision of a take-up device for properly supporting the take-up loop in the belt. The variation in belt length, for example, may exceed 50 feet so that a vertical type gravity take-up is neither practical nor convenient. Horizontal type take-ups, on the other hand, have in the past lacked certain of the desirable characteristics of the vertical type take-ups such as the ability to properly support the unusually long take-up loop of the belt in all positions of the take-up.

The primary object is to provide a horizontal type gravity take-up for properly maintaining the tension in a conveyor belt despite great variations in its length.

A further important object of the invention is to provide a horizontal type gravity take-up for maintaining uniform tension in a conveyor belt while properly supporting the take-up loop of the belt despite great variations in the length of the loop.

A further object of the invention is to provide a horizontal type gravity take-up for maintaining the proper tension in a conveyor belt while supporting the take-up loop of the belt at closely spaced points throughout its entire length despite great variations in the length.

Still another object of the invention is to provide a gravity type take-up for maintaining the proper tension in a conveyor belt which supports the take-up loop of the belt in a substantially horizontal position and at closely spaced points throughout its entire length despite great variations in the length.

Other objects and advantages of the invention will become apparent during the course of the following description.

Figure 1:
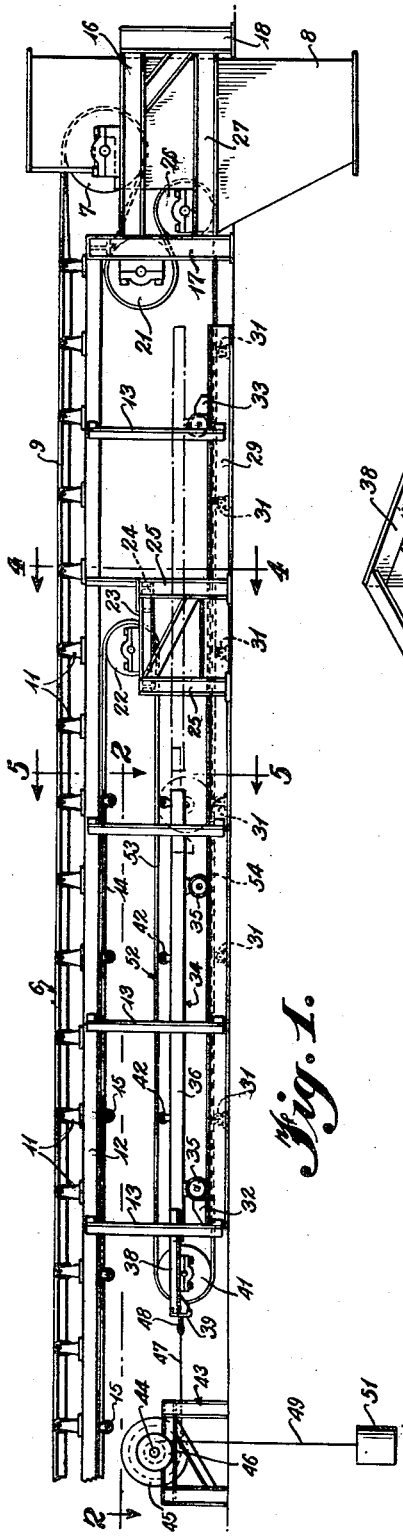
Figure 3:
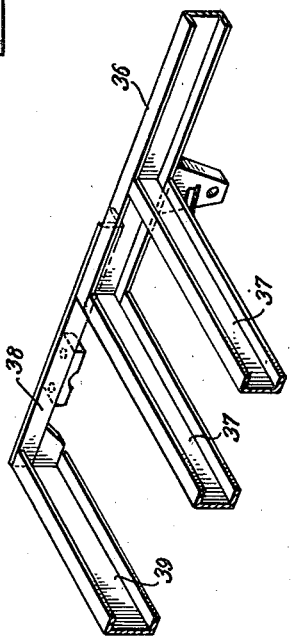
Figure 2:
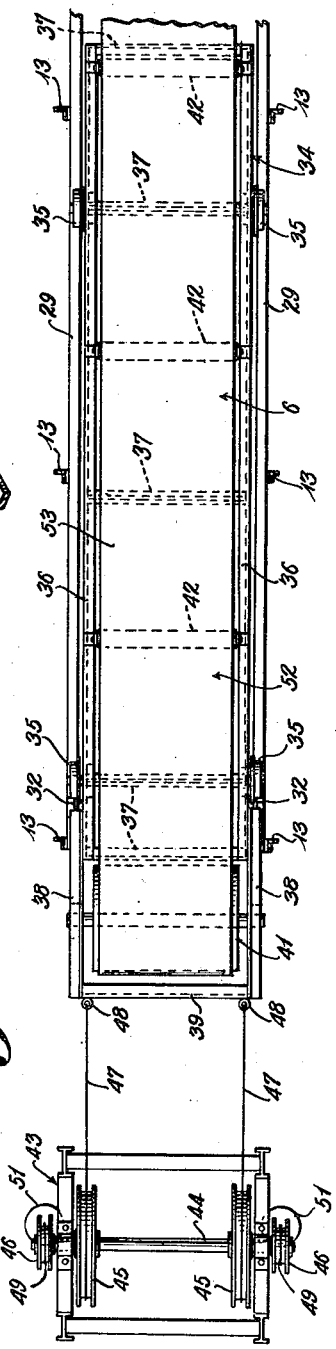
Figure 4:
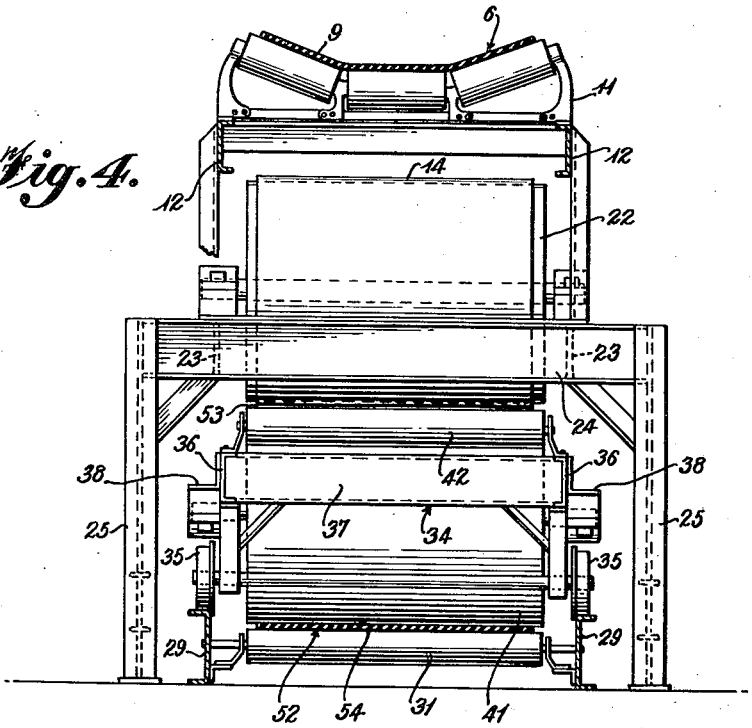
Figure 5:
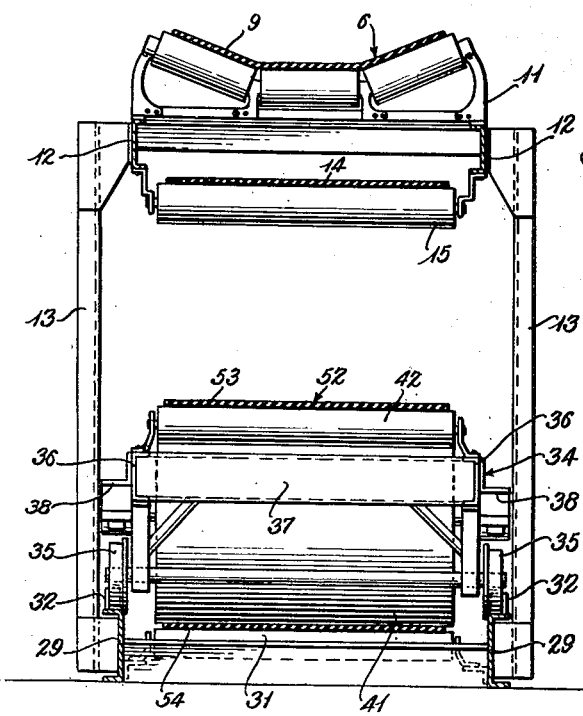

In the accompanying drawings forming a part of this specification and in which like reference characters are used to designate like parts throughout the same, Figure 1 is a side elevational view of a portion of a belt conveyor take-up embodying this invention, Figure 2 is a horizontal sectional view taken on line 2—2 of Fig. 1, Figure 3 is a fragmentary perspective view showing one corner portion of the take-up carriage or frame, Figure 4 is a transverse sectional view taken on line 4—4 of Fig. 1, and Figure 5 is a transverse sectional view taken on line 5—5 of Fig. 1.

In the drawings, wherein for the purpose of illustration is shown the preferred embodiment of this invention, and first particularly referring to Fig. 1, there is shown the head end portion of a belt conveyor at which the take-up mechanism that embodies this invention is normally installed. It will be appreciated that the remainder of the conveyor, which is not illustrated, is constructed and arranged in a conventional and well-known manner and will necessarily include an end pulley and supporting idlers. The conveying belt, designated by the reference character 6, is trained over a drive pulley 7 which is mounted above a discharge hopper 8, or the like, at the head end of the conveyor. The load carrying run 9 of the belt is supported throughout its length by troughing idlers 11 mounted on longitudinal beams 12 which are positioned on opposite sides of the conveyor. The beams 12 are in turn supported by vertical posts 13 at longitudinally spaced points along their lengths. The return run 14 of the belt is supported throughout substantially its entire length by idlers 15 which are mounted on the bottoms of the longitudinal beams 12.

The drive pulley 7 is supported by beams 16 arranged on opposite sides of the hopper 8 and extending between vertical posts 17 and 18. The vertical posts 17 also support the ends of the longitudinal beams 12.

Mounted on the vertical posts 17 with its top above the level of the bottom of the drive pulley 7 is a second drive pulley 21 about which the belt is trained after passing over the drive pulley 7. It will be appreciated that the stepped arrangement of the two drive pulleys 7 and 21 will increase the arc of engagement between the belt 6 and the drive pulleys so that, when driven by any suitable prime mover, they will have sufficient driving engagement with the belt to effect operation of the conveyor.

The tops of the idler rolls 15 are arranged in longitudinal alinement and define a plane which, for purposes of convenience, will be referred to as the principal plane of the return run 14. Spaced longitudinally from the second drive pulley 21 with its top in the principal plane of the return run 14 is a reversing pulley 22 which is mounted on longitudinal beams 23 arranged on opposite sides of the conveyor and extending between transverse beams 24, the opposite end portions of which are supported by vertical posts 25. Positioned below and toward the end of the conveyor from the second drive pulley 21 is a bend pulley 26 which is mounted on longitudinal beams 27 extending between the posts 17 and 18. The bottom of the bend pulley 26 is at a stepped level below that of the reversing pulley 22 so that the vertical distance from the bottom of the bend pulley to the principal plane of the return run is greater than the vertical distance from the bottom of the reversing pulley to the principal plane of the return run.

Referring now to Figs. 1 to 5, inclusive, for a detail description of the take-up mechanism, a pair of track members 29 are arranged on opposite sides of the conveyor and extend longitudinally from points adjacent the bend pulley 26 to points beyond the reversing pulley 22. The bottoms of the vertical post 13 are connected to the outer sides of the track members 29. The outer end portions of the track members 29, most remote from the bend pulley 26, extend for a sufficient distance beyond the reversing pulley 22 to permit necessary extension of the take-up loop as will be later described. Extending between the track members 29 at spaced points along their lengths are a plurality of idler rolls 31 which are arranged with their tops in alinement and in a plane at approximately belt thickness below the bottom of the bend pulley 26. The outer ends of the track members 29 have mounted thereon a pair of limit stops 32 which extend vertically upwardly from the track members. A similar pair of stops 33 are mounted at the inner end portions of the track members.

Mounted for longitudinal movement along the track members 29 is an elongated take-up carriage or frame 34 having wheels 35 engaging the track members to guide the movement of the carriage. The body of the carriage 34 is formed of a pair of longitudinal beams 36 upon which the wheels 35 are mounted. The beams 36 are held in laterally spaced relationship by the transverse members 37 which extend between and are connected to the beams at spaced points along their lengths. The outer end portion of the carriage 34, most remote from the bend pulley 26, is provided with a pulley mounting frame formed of a pair of angle irons 38 which extend outwardly from the ends of the longitudinal beams 36 and are connected at their outer ends by a transverse beam 39, as is best illustrated in Fig. 3.

Mounted between the angle irons 38, the transverse beam 39 and the transverse member 37 at the end of the carriage 34 is a take-up pulley 41 which is movable with the carriage 34 toward and away from the bend and reversing pulleys 26 and 22, respectively. The diameter of the take-up pulley 41 and its arrangement on the carriage 34 are such that, when moved along the track members 29 by the carriage, the bottom of the take-up pulley will pass through a plane which is not less than belt thickness above the tops of the idler rolls 31 and the top of the take-up pulley will move through a plane not less than belt thickness below the bottom of the reversing pulley 22.

Mounted at spaced points on the top of the carriage 34 are a plurality of idler rolls 42, the tops of which are in alinement with the top of the take-up pulley 41 in a plane not less than belt thickness below the bottom of the reversing pulley 22.

Spaced longitudinally from the outer ends of the track members 29 is a frame 43 upon which is rotatably mounted an axle 44 having a pair of reels or drums 45 rigidly mounted thereon in longitudinal alinement with the sides of the carriage 34. Rigidly mounted on the ends of the axle 44 outwardly of the reels 45 are a second pair of reels 46 having diameters which are substantially less than those of the reels 45. Each of the reels 45 has wound thereon a cable 47, or the like, which extends longitudinally from the reel for connection with an eyelet 48 on the transverse beam 39 at the outer end of the carriage 34. An additional pair of cables 49 are wound around the reels 46 and extend downwardly therefrom to suspend a pair of counterweights 51. The cables 47 and reels 45 thereby apply a predetermined pull on the carriage 34 which tends to urge the carriage in a direction away from the bend pulley 26 and reversing pulley 22. The amount of pull applied by the cables 47 will depend upon the relative diameters of the reels 45 and 46 and the weight of the counterweights 51 and must be equal to at least twice the minimum tension necessary in the belt 6 to prevent slippage between the belt and the pulley by which the belt is driven.

The operation of the take-up device will be described as follows:

The return run 14 of the conveyor belt 6 is trained around the reversing pulley 22 which defines one of the limits of the take-up loop in the belt. From the pulley 22, the belt 6 extends longitudinally to and is trained around the take-up pulley 41 at the closed end of the take-up loop. The other limit of the take-up loop is defined by the bend pulley 26 and the belt 6 extends longitudinally from the take-up pulley 41 to the bend pulley. The two lengths of belt between the reversing and bend pulleys 22 and 26, respectively, and the take-up pulley 41 form the vertically spaced parallel sides of the take-up loops 52. The upper side 53 of the take-up loop 52 extends between the bottom of the reversing pulley 22 and the top of the take-up pulley 41 and the lower side 54 of the take-up loop 52 extends between the bottom of the bend pulley 26 and the bottom of the take-up pulley.

When the tension in the load carrying run 9 of the conveyor belt 6 is increased, as by an increase in the weight of the material carried by the belt or by the starting of the conveyor, the total length of the belt will be substantially increased. This increase becomes more pronounced when belts having greater resiliency are employed or when the total length of the conveyor is increased. For unusually long conveyors employing belts having a substantial degree of resiliency, the increase in belt length may be as much as 50 feet or more.

In order to compensate for such an increase in the length of the belt 6, the length of the take-up loop 52 must be increased by movement of the take-up pulley 41. Since the movement of the take-up pulley 41 for a given distance will effect an increase in the length of both the upper and lower sides 53 and 54, respectively, of the take-up loop 52 by an amount equal to the given distance, movement of the take-up pulley will be one-half the increase in the total belt length. The force exerted on the carriage 34 by the cables 47, however, will be divided between the upper and lower sides 53 and 54, respectively, of the take-up loop 52 so that the force applied by the cables must be at least twice as great as the minimum tension which it is necessary to maintain in the belt 6.

It will be readily apparent that movement of the carriage 34 and the take-up pulley 41 mounted thereon into their most remote position from the bend pulley 26, at which the wheels 35 engage the limiting stops 32, will cause the lower side 54 of the take-up loop 52 to be increased to its maximum length. At this maximum length, the lower side 54 of the loop is supported at spaced points along its entire length by the idler rolls 31. As the carriage 34 is moved toward the bend pulley 26 to a position at which the wheels 35 engage the limiting stops 33, the take-up pulley 41 is moved over the tops of the idler rolls 31 and the length of the lower side 54 of the loop is decreased. This innermost position of the carriage 34 is illustrated by broken lines in Fig. 1. At either of the two end points of travel of the carriage 34 and at any of the intermediate positions therebetween, the lower side 54 of the take-up loop 52 will be supported at spaced points throughout its entire length by engagement with the idler rolls 31.

During the above described movement of the carriage 34, the idler rolls 42 mounted at longitudinally spaced points thereon are moved into and out of supporting engagement with the upper side 53 of the take-up loop 52. When the carriage 34 is moved into its most remote position at which the length of the upper side 53 is increased to a maximum value, all of the idler rolls 42 will be moved into engagement with the upper side of the loop. As the carriage 34 is moved toward the bend pulley 26 and the upper side 53 of the loop is decreased in length, the idler rolls, starting at the end of the carriage most nearly adjacent the bend pulley 26, will be moved successively beneath the reversing pulley 22 and out of engagement with the belt. It will be noted, however, that in any of the various positions of the carriage 34 the upper run 53 of the loop will be supported at spaced points throughout its entire length by the idler rolls 42.

It is to be understood that the form of the invention herewith shown and described is to be taken as a preferred example of the same and that various changes in the shape, size, and arrangement of parts may be resorted to without departing from the spirit of the invention or the scope of the subjoined claims.

Having thus described the invention, I claim:

1. In a belt conveyor having an endless conveyor belt, means for supporting the load carrying and return runs of the belt, and means for driving said belt, the improvement of a take-up for automatically maintaining the proper tension in the belt during operation of the conveyor which comprises a reversing pulley and a bend pulley mounted for rotation about fixed axes, spaced from each other longitudinally of and located at vertically stepped levels beneath said conveyor, about which the return run of the conveyor belt is trained for defining a take-up loop portion of said run, an elongated frame mounted for rectilinear movement longitudinally of said conveyor beneath said reversing pulley and toward and away from said bend pulley, a take-up pulley mounted on the outer end of said frame about which the take-up loop of the belt is trained, said take-up pulley being so located and having such a diameter as to position the two runs of said loop in parallel relationship with the direction of movement of said frame, means mounted longitudinally along said frame for movement therewith to continuously support the variable length of belt in the upper run of the take-up loop in said parallel relationship, means mounted along and below the path of movement of the frame for continuously supporting the variable length of belt in the lower run of the take-up loop in said parallel relationship, and means for applying a constant force to said frame to urge the latter in a direction to increase the length of the take-up loop.

2. In a belt conveyor having an endless conveyor belt, means for supporting the load carrying and return runs of the belt, and means for driving said belt, the improvement of a take-up for automatically maintaining the proper tension in the belt during operation of the conveyor which comprises a reversing pulley and a bend pulley mounted for rotation about fixed axes, spaced from each other longitudinally of and located at vertically stepped levels beneath said conveyor, about which the return run of the conveyor belt is trained for defining a take-up loop portion of said run, an elongated frame mounted for horizontal movement beneath said reversing pulley and toward and away from said bend pulley, a take-up pulley mounted on the outer end of said frame about which the take-up loop of the belt is trained, said take-up pulley being so located and having such a diameter as to horizontally position the two runs of said loop in vertically spaced parallel relationship, means mounted horizontally along said frame for movement therewith to continuously support the variable length of belt in the upper run of the take-up loop in its horizontal position, means mounted along and below the path of movement of the frame for continuously supporting the variable length of belt in the lower run of the take-up loop in its horizontal position, and means for applying a constant force to said frame to urge the latter in a direction to increase the length of the take-up loop.

3. In a belt conveyor having an endless conveyor belt, means for supporting the load carrying and return runs of the belt, and means for driving said belt, the improvement of a take-up for automatically maintaining the proper tension in the belt during operation of the conveyor which comprises a reversing pulley and a bend pulley mounted for rotation about fixed axes, spaced from each other longitudinally of and located beneath said conveyor, about which the return run of the conveyor belt is trained for defining a take-up loop portion of said run, an elongated frame mounted for rectilinear movement along a path beneath said reversing pulley and toward and away from said bend pulley, a take-up pulley mounted on the outer end of said frame about which the take-up loop of the belt is trained, said take-up pulley being so located and having such a diameter as to position the two runs of said loop, a plurality of idlers mounted at longitudinally spaced points along said frame for movement therewith to continuously support the upper run of the take-up loop throughout its variable length in said parallel relationship, means mounted along and below the path of movement of the frame for continuously supporting the variable length of belt in the lower run of the take-up loop in said parallel relationship, and means for applying a constant force to said frame to urge the latter away from said bend pulley to increase the length of the take-up loop.

4. In a belt conveyor having an endless conveyor belt, means for supporting the load carrying and return runs of the belt, and means for driving said belt, the improvement of a take-up for automatically maintaining the proper tension in the belt during operation of the conveyor which comprises a reversing pulley and a bend pulley mounted for rotation about fixed axes, spaced from each other longitudinally of and located at vertically stepped levels beneath said conveyor, about which the return run of the conveyor belt is trained for defining a take-up loop portion of said run, a pair of rail members mounted on opposite sides of the conveyor and extending horizontally from points adjacent the ends of the bend pulley to points beyond the reversing pulley, an elongated carriage mounted for horizontal movement along said rail members beneath said reversing pulley and toward and away from said bend pulley, a take-up pulley mounted on the outer end of said carriage about which the take-up loop of the belt is trained, said take-up pulley being so located and having such a diameter as to horizontally position the two runs of said loop in vertically spaced parallel relationship, a plurality of idlers mounted in horizontal alinement at longitudinally spaced points along said carriage for movement therewith to continuously support in said parallel relationship the upper run of the take-up loop throughout its variable length, a plurality of idlers mounted in horizontal alinement at longitudinally spaced points along and below the path of movement of the carriage for continuously supporting in said parallel relationship the lower run of the take-up loop throughout its variable length, and a counterweighted cable connected to said carriage for urging the carriage away from said bend pulley to increase the length of the take-up loop.

5. In a belt conveyor, having an endless conveyor belt, means for supporting the load carrying and return runs of the belt, and means for driving said belt, the improvement of a take-up for automatically maintaining the proper tension in the belt despite large variations in the length of the belt during operation of the conveyor, said take-up comprising a pair of pulleys, mounted for rotation about fixed axes beneath the load carrying run of the belt, about which the return run of the belt is trained for defining a take-up loop portion of the return run, an elongated frame mounted for reciprocating rectilinear movement through a path adjacent the return run of the belt, a take-up pulley mounted on one end of said frame about which the take-up loop of the belt is trained, means mounted on said frame for movement therewith to continuously support the variable length of belt in tangential alinement between one side of said take-up pulley and one of said pair of take-up loop defining pulleys, means mounted along the path of movement of said frame for continuously supporting the variable length of belt in tangential alinement between the opposite side of said take-up pulley and the other of said pair of take-up loop defining pulleys, and means for applying a constant force to urge said frame in a direction to increase the length of said take-up loop.

6. In a belt conveyor having an endless conveyor belt, means for supporting the load carrying and return runs of the belt, and means for driving said belt, the improvement of a take-up for automatically maintaining the proper tension in the belt despite large variations in the length of the belt during operation of the conveyor, said take-up comprising a pair of pulleys, mounted for rotation about fixed axes, about which the return run of the belt is trained for defining a take-up loop portion of the return run, an elongated frame, a plurality of idlers mounted on said frame at spaced points along its length with their peripheries alined in a plane at substantially belt thickness from the periphery of one of said pair of take-up loop defining pulleys, means supporting said frame for reciprocating rectilinear movement in parallel relationship with the alined peripheries of said idlers, a plurality of idlers mounted at fixed points along the path of movement of said frame with their peripheries alined in a plane at substantially belt thickness from the periphery of the other of said pair of take-up loop defining pulleys, pulley means, mounted on the end of said frame most remote from said pair of pulleys and having opposite sides of its periphery in tangential alinement with the idlers on said frame and said other of said pair of take-up loop defining pulleys, respectively, about which the take-up loop is trained and from which the sides of the loop extend over and are continuously supported by said idlers, and means for applying a constant force to urge said frame in a direction to increase the length of the take-up loop.

References Cited in the file of this patent

UNITED STATES PATENTS

| | | |
|---|---|---|
| 723,504 | Titus | Mar. 24, 1903 |
| 1,977,147 | Rogers et al. | Oct. 16, 1934 |
| 2,263,506 | Lane | Nov. 18, 1941 |
| 2,452,980 | Beltz | Nov. 2, 1948 |
| 2,538,951 | Thomson | Jan. 23, 1951 |
| 2,631,715 | Vickers | Mar. 17, 1953 |
| 2,640,582 | Madeira | June 2, 1953 |